US009722694B2

(12) United States Patent
Ratterree et al.

(10) Patent No.: US 9,722,694 B2
(45) Date of Patent: Aug. 1, 2017

(54) BACKUP COMMUNICATIONS SCHEME IN COMPUTER NETWORKS

(71) Applicant: Microsoft Technology Licensing, LLC, Redmond, WA (US)

(72) Inventors: Gary Ratterree, Sammamish, WA (US); Jeff Cox, Fall City, WA (US); Gerald Degrace, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 9 days.

(21) Appl. No.: 14/852,184

(22) Filed: Sep. 11, 2015

(65) Prior Publication Data

US 2017/0078015 A1    Mar. 16, 2017

(51) Int. Cl.
*H04B 10/03* (2013.01)
*H04Q 11/00* (2006.01)
*H04L 12/24* (2006.01)
*H04L 12/721* (2013.01)
*H04L 29/14* (2006.01)

(52) U.S. Cl.
CPC ......... *H04B 10/03* (2013.01); *H04L 41/0668* (2013.01); *H04L 41/084* (2013.01); *H04L 45/26* (2013.01); *H04L 69/40* (2013.01); *H04Q 11/0005* (2013.01); *H04Q 11/0066* (2013.01); *H04Q 2011/0043* (2013.01); *H04Q 2011/0081* (2013.01)

(58) Field of Classification Search
None
See application file for complete search history.

(56) References Cited

U.S. PATENT DOCUMENTS

| 8,483,046 | B2 | 7/2013 | DeCusatis |
| 8,705,954 | B2 | 4/2014 | Singla et al. |
| 8,948,181 | B2 | 2/2015 | Kapadia et al. |
| 8,965,203 | B1 | 2/2015 | Vahdat et al. |
| 9,025,434 | B2 | 5/2015 | Maltz et al. |
| 2007/0058973 | A1 | 3/2007 | Tanaka |
| 2012/0076006 | A1 | 3/2012 | DeCusatis |

(Continued)

FOREIGN PATENT DOCUMENTS

CN    103686467 A    3/2014

OTHER PUBLICATIONS

Zhu, et al., "Fully Programmable and Scalable Optical Switching Fabric for Petabyte Data Center", In Proceedings of Optics Express, vol. 23, Issue 3, Feb. 5, 2015, 18 pages.

(Continued)

*Primary Examiner* — Darren E Wolf
(74) *Attorney, Agent, or Firm* — Liang IP, PLLC

(57) ABSTRACT

Various techniques for managing communications backup for computer networks are disclosed herein. In one embodiment, a method includes detecting an abnormal operating condition at a primary network node, the primary network node being coupled to a computing device via a first optical connection between an optical switch and the primary network node. In response to the detected abnormal operation condition, the method includes prompting the optical switch to switch from the first optical connection to a second optical connection between the optical switch and a standby network node. The method further includes instructing the standby network node to facilitate communications with the computing device based on the replicated network configuration.

20 Claims, 9 Drawing Sheets

(56) References Cited

U.S. PATENT DOCUMENTS

| 2012/0099863 A1 | 4/2012 | Xu et al. |
| 2012/0236761 A1 | 9/2012 | Yang et al. |
| 2013/0232382 A1 | 9/2013 | Jain et al. |
| 2014/0006843 A1 | 1/2014 | Kim et al. |
| 2014/0064104 A1 | 3/2014 | Nataraja et al. |

OTHER PUBLICATIONS

McGillicuddy, Shamus, "Plexxi SDN includes tiered controller, data center-based WDM", Published on: Dec. 5, 2012 Available at: http://searchsdn.techtarget.com/news/2240173858/Plexxi-SDN-includes-tiered-controller-data-center-based-WDM.

Driver, et al.,"IBM zEnterpriseBladeCenter Extension—Network Connectivity Options", In Red Paper, May, 2014, 58 pages.

"High Availability for the Contrail OVSDB TOR Agent (2.20)", Retrieved on: Jun. 10, 2015 Available at: https://techwiki.juniper.net/Documentation/Contrail/Contrail_Controller_Getting_Started_Guide/40_Extending_Contrail_to_Physical_Routers,_Bare_Metal_Servers,_Switches,—and_Interfaces/21_High_Availability_for_the_Contrail_TOR_Agent_(2.20).

Gill, et al., "Understanding Network Failures in Data Centers: Measurement, Analysis, and Implications", In Proceedings of the ACM SIGCOMM conference, Aug. 15, 2011, 12 pages.

Wu, et al., "NetPilot: Automating Datacenter Network Failure Mitigation", In Proceedings of ACM SIGCOMM Conference, Aug. 13, 2012, pp. 419-430.

"International Search Report and Written Opinion Issued in PCT Application No. PCT/US2016/046096", Mailed Date: Nov. 2, 2016, 10 Pages.

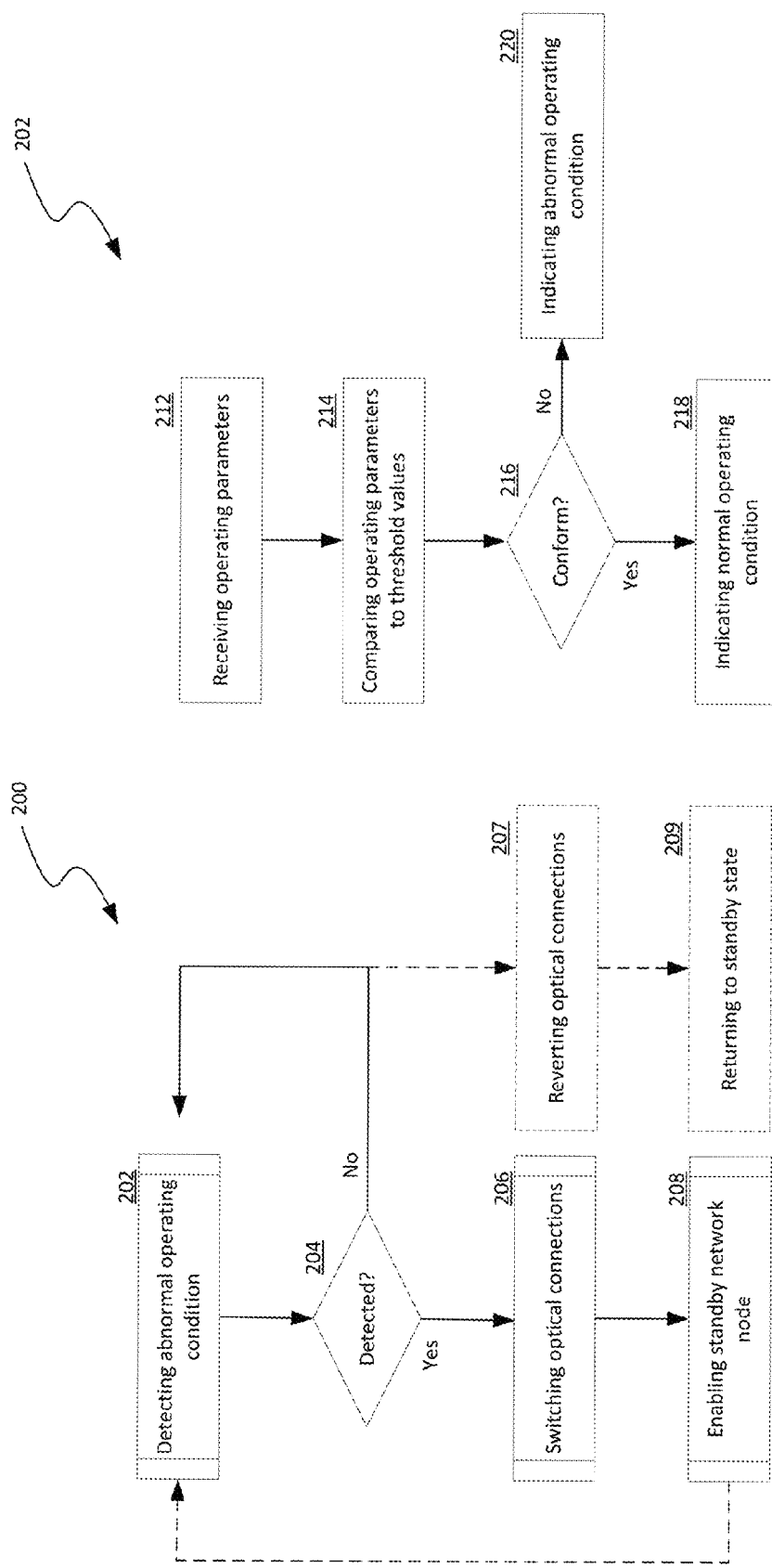

BACKUP COMMUNICATIONS SCHEME IN COMPUTER NETWORKS

BACKGROUND

Computer networks can have a large number of servers or other types of computing devices interconnected with one another by routers, switches, bridges, firewalls, or other network nodes via wired or wireless network links. The network nodes can enable communications among the computing devices by exchanging messages via the network links in accordance with one or more network protocols.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Computer networks in datacenters can include multiple interconnected switches, routers, and other network nodes organized into a hierarchy, a mesh, or other suitable arrangements. For example, in one implementation, a single enclosure (e.g., a rack) can house multiple servers that are coupled to a single switch associated with the enclosure. Such a switch is sometimes referred to as "top-of-rack" or "TOR" switch. Multiple TOR switches can then be connected to one or more Tier 1 or "T1" switches, each of which can in turn be connected to one or more Tier 2 or "T2" switches.

Typically, redundancy of T1, T2, or other upper-level switches can be readily provided, for example, by adding one or more extra switches. In contrast, providing redundancy for TOR switches can be challenging due to added costs and operating complexity. For instance, one solution includes installing two TOR switches for each enclosure housing multiple computing devices and provisioning two network interface controllers ("NICs") in each of the computing devices. However, such an arrangement can easily double the capital investments associated with the TOR switches. Also, the dual TOR switches may confuse the computing devices during operation because both TOR switches may be operating at the same time. As such, the computing devices can be more prone to communications failures with dual NICs communicating with dual TOR switches than using just one NIC for each computing device.

Several embodiments of the disclosed technology can provide efficient and cost effective TOR switch redundancy by implementing optical switching between multiple primary TOR switches and one or more standby TOR switches. In one implementation, computing devices in an enclosure can be individually coupled to an optical multiplexer via fiber optic cables. A primary optical switch can then couple the optical multiplexer to a primary TOR switch. The primary optical switch can switch the computing devices from being connected to the primary TOR switch to a standby optical switch when the primary TOR switch encounters abnormal operation conditions. In turn, the standby optical switch can couple the primary optical switch to a standby TOR switch operating in place of the primary TOR switch.

The standby TOR switch can be generally similar to the primary TOR switch in structure and function. As such, a single standby TOR switch can provide redundancy for two, four, eight, sixteen, thirty two, or any other suitable number of primary TOR switches. Thus, capital investments for providing redundancy to the primary TOR switches can be much lower than using dual TOR switches for each enclosure. Several embodiments of the disclosed redundancy scheme can also be more efficient than using dual TOR switches per enclosure because switching optical switches can be a simple operation. Optical switches can be more reliably switched than switching between a pair of active TOR switches. Thus, communications reliability of computer networks in datacenters can be improved.

BRIEF DESCRIPTION OF THE DRAWINGS

FIG. 4 is a flow diagram illustrating embodiments of a process of providing standby backup capabilities to a network node in a computer network in accordance with embodiments of the disclosed technology.

FIG. 5 is a flow diagram illustrating embodiments of a process of detecting abnormal operating conditions at a network node to a computer network in accordance with embodiments of the disclosed technology.

DETAILED DESCRIPTION

Figure 1:
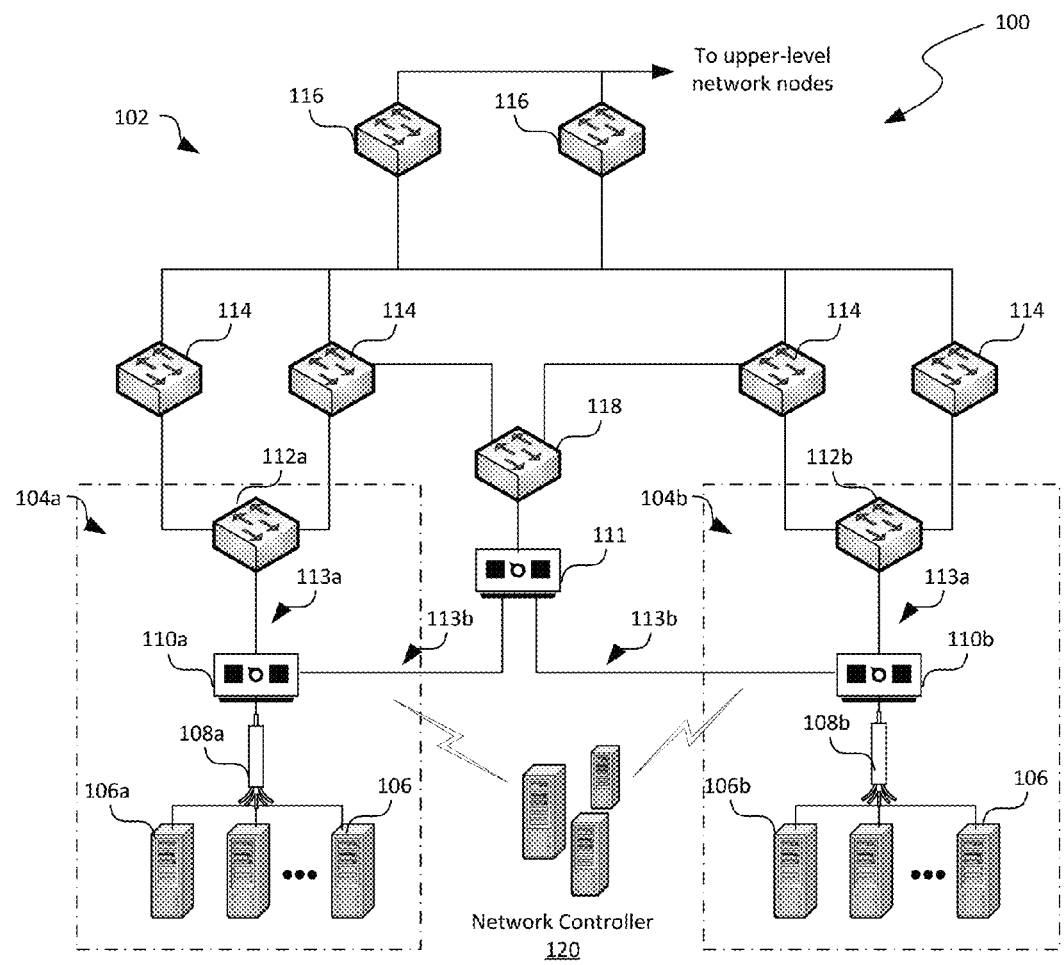
FIG. 1 is a schematic diagram illustrating a computer network having a standby network node in accordance with embodiments of the disclosed technology.

Certain embodiments of systems, devices, components, modules, routines, and processes for managing backup capability of primary network nodes in a computer network are described below. In the following description, specific details of components are included to provide a thorough understanding of certain embodiments of the disclosed technology. A person skilled in the relevant art will also understand that the disclosed technology may have additional embodiments or may be practiced without several of the details of the embodiments described below with reference to FIGS. 1-9.

As used herein, the term "computer network" generally refers to an interconnected network that has a plurality of network nodes connecting a plurality of computing devices (e.g., servers) to one another and to other networks (e.g., the Internet). One example computer network can include a Gigabit Ethernet network implemented in a datacenter for providing various cloud-based computing services. The term "network node" generally refers to a physical or software emulated network device. In one example, a network node can include a TOR switch. In other examples, network nodes can include routers, other types of switches, hubs, bridges, load balancers, security gateways, firewalls, network name translators, and name servers. Each network node may be associated with one or more ports. As used herein, a "port" generally refers to a physical and/or logical communications interface through which data packets and/or other suitable types of communications can be transmitted and/or received. For example, switching one or more ports can include switching routing data from a first optical port to a second optical port, or switching from a first TCP/IP port to a second TCP/IP port.

The term "optical switch" generally refers to i-s-a switch configured to selectively switch signals in optical fibers or integrated optical circuits from one circuit or optical pathway to another. An optical switch can have a number of input and output ports. For example, a "1:2" optical switch includes a single input port and two selectively switchable output ports. A "32:1" optical switch includes thirty two input ports selectively connectable to a single output port. In another example, a "16:2" optical switch includes sixteen input ports each selectively connectable to one of the two output ports. An optical switch can include mechanical, electro-optic, magneto-optic, or other suitable switching mechanisms. Example optical switches suitable for various embodiments of the disclosed technology include N77 series optical switches provided by Agilent Technologies of Santa Clara, Calif. and S Series optical circuit switches provided by Calient Technologies, of Goleta, Calif.

The term "standby" is used herein to denote a readiness for duty and/or immediate deployment. For example, a standby network node (e.g., a standby switch or router) can be generally similar in structure and/or function as a corresponding primary network node. The standby network node can also be suitably connected to other computing devices, network nodes, or other components of a computer network via, for example, fiber optic, Ethernet, or other suitable types of cables. In certain embodiments, the standby network node can be powered up and await instructions to perform certain functions in a computer network in place of the corresponding primary network node. In other embodiments, the standby network node can be in a power-safe mode and may be awaken upon reception of certain instructions to perform the functions in place of the corresponding primary network node.

FIG. 1 is a schematic diagram illustrating a computer network 100 having a standby network node as a backup for multiple primary network nodes in accordance with embodiments of the disclosed technology. As shown in FIG. 1, the computer network 100 can include a network controller 120 and multiple network nodes 102 interconnecting multiple computing devices 106. Even though particular components are shown in FIG. 1, in other embodiments, the computer network 100 can also include additional and/or different network nodes 102, computing devices 106, and/or other suitable types of components.

The network nodes 102 can be organized into a hierarchy, a mesh, or other suitable organizations. For instance, in the illustrated embodiment, the network nodes 102 can include primary network nodes 112 (illustrated as first primary network node 112a and second primary network node 112b), tier one network nodes 114, and tier two network nodes 116 interconnected with one another in a hierarchy. In particular, the primary network nodes 112 are individually connected with one or more tier one network nodes 114. In turn, the tier one network nodes 114 are individually connected with one or more tier two network nodes 116. Though not shown in FIG. 1, the computer network 100 can include additional network nodes 102 at tier 3, tier 4, or at other suitable number of tiers. In FIG. 1, particular number of network nodes 102 at each tier are shown for illustration purposes. In other embodiments, the computer network 100 can include any suitable number of network nodes 102 at each tier. In further embodiments, the computer network 100 can also be connected to a core network (not shown).

As shown in FIG. 1, the computing devices 106 can be organized into sets of computing devices 106. Each set can be individually associated with an enclosure 104 (illustrated as first enclosure 104a and second enclosure 104b). Each computing device 106 can be a network server, a storage server, a network storage device, or other suitable types of computing component. In certain embodiments, the enclosures 104 can include physical structures (e.g., racks, cabinets, shipping containers, etc.) housing the computing devices 106. In other embodiments, the enclosures 104 can be logical divisions or groupings of sets or subsets of the computing devices 106. In further embodiments, the enclosures 104 can be both physical structures that house the computing devices 106 and logical groupings of the housed computing devices 106. Even though only two enclosures 104 are illustrated in FIG. 1, in other embodiments, the computer network 100 can include four, eight, sixteen, thirty two, or any suitable number of enclosures 104.

As shown in FIG. 1, in each enclosure 104, multiple fiber optic cables connect a set of the computing devices 106 to an optical multiplexer 108 (individually identified as first and second optical multiplexers 108a and 108b). A pair of fiber optic cables (or a single fiber optic cable) carrying multiplexed signals can connect the optical multiplexer 108 to a primary optical switch 110 (illustrated as first primary optical switch 110a and second primary optical switch 110b). The optical multiplexer 108 can be configured to multiplex/de-multiplex signals to/from the computing devices 106 in the enclosure 104 utilizing wavelength division multiplexing, time division multiplexing, or other suitable multiplexing techniques. One example optical multiplexer suitable for the computer network 100 is a remotely controlled layer 1 A/B switch Model No. SW1044A-SM provided by Black Box Corporation of Lawrence, Pa. In other embodiments, each enclosure 104 can also include two or more optical multiplexers 108 (not shown) both connected to the primary optical switch 110 and individually to a subset of the computer devices 106 in each enclosure 104. In further embodiments, the optical multiplexers 108 may be omitted or integrated into the corresponding optical switches 110. As such, fiber optic cables can connect the computing devices 106 in each enclosure 104 directly to the optical switch 110.

Each enclosure 104 can also be associated with one of the primary network nodes 112. For example, as illustrated in FIG. 1, the optical switches 110 in the enclosures 104 are individually connected with a corresponding primary network node 112 via, for example, fiber optic cables. The primary network node 112 can be configured to facilitate communications with all or a portion of the computing devices 106 in the individual enclosures 104. In certain embodiments, each primary network node 112 can be a TOR switch. In other embodiments, the primary network nodes 112 can also include load balancers, firewalls, or other suitable types of network devices. One example network device suitable for the primary network node 112 is a network switch (Model No. Cisco Catalyst 4500-X Switch) provided by Cisco System, Inc. of San Jose, Calif.

As shown in FIG. 1, the computer network 100 can also include one or more standby network nodes 118 and a standby optical switch 111 configured to provide standby backup capability to the primary network nodes 112. In the illustrated embodiment, the primary optical switches 110 can each include an output port connected to an input port of the standby optical switch 111. As such, the primary optical switches 110 can have a 1:2 configuration with one input port connected to the optical multiplexer 108 and two output ports individually connected to the primary network node 112 and the standby network node 118. The standby optical switch 111 can have a 2:1 configuration with two input ports individually connected to the first and second primary optical switches 110a and 110b and an output port connected to the standby network node 118. In other embodiments, the standby optical switch 111 can also have 3:1, 4:1, 8:1, 16:1, 32:1, or other suitable configurations to accommodate additional primary optical switches 110 (not shown).

The standby network node 118 can have generally similar connectivity with higher level network nodes 102 as the primary network nodes 112. For example, in the illustrated embodiment, the standby network node 118 can be connected to one or more of the tier one network nodes 114. In other embodiments, the standby network node 118 can also be connected to one or more of the tier two or other suitable network nodes 102. In certain embodiments, the standby network node 118 can be generally similar in structure and function as the primary network nodes 112. In other embodiments, the standby network node 118 can have different structure and/or function as the primary network nodes 112. One example is described in more detail below with reference to FIG. 8.

The network controller 120 can include a sever, a virtual machine, or other suitable computing facilities operatively coupled to the computing devices 106, the primary optical switches 110, the primary network nodes 112, the standby optical switch 111, the standby network node 118, and/or other components of the computer network 100. In FIG. 1, the network controller 120 is shown as being independent from the computing devices 106. In other embodiments, the network controller 120 can be hosted on one or more of the computing devices 106. In certain embodiments, the network controller 120 can include components of a software defined network ("SDN") controller associated with the computer network 100. In other embodiments, the network controller 120 can also include components of a cloud controller (e.g., Microsoft Azure™ controller) associated with the computer network 100.

In operation, the network nodes 102 can facilitate communications with the computing devices 106. For example, in certain embodiments, messages (e.g., packets) from a computing device 106a in the first enclosure 104a can be routed to another computing device 106b in the second enclosure 104b via a first optical connection along the first optical multiplexer 108a, the first primary optical switch 110a, and the first primary network 112a to a tier one network node 114. The tier one and/or tier two network nodes 114 and 116 can then route the messages to the computing device 106b following a suitable protocol. The tier one and/or tier two network nodes 114 and 116 can also route the messages to a destination outside the computer network 100 via upper-level network nodes (not shown), core network nodes (not shown) or other suitable components.

During operation, the network controller 120 can be configured to monitor for an abnormal operating condition of one or more of the primary network nodes 112 and provide backup capabilities with the standby network node 118 accordingly. For example, in response to a detected abnormal operating condition at, for instance, the first primary network node 110a, the network controller 120 can be configured to cause the first primary optical switch 110a to switch from the first optical connection 113a to a second optical connection 113b between the first primary optical switch 110a and the standby network node 118. The network controller 120 can also be configured to cause the standby optical switch 111 to connect the first primary optical switch 110a to the standby network node 118. The network controller 120 can then enable the standby network node 118 to facilitate communications with the computing devices 106 in the first enclosure 104a in place of the first primary network node 112a. Similarly, in response to a detected abnormal operation condition at the second primary network node 110b, the network controller 120 can also cause the standby network node 118 to provide backup capability for the second primary network node 110b.

As such, the standby network node 118 can provide standby backup capabilities to two, three, or any suitable number of primary network nodes 112. Thus, capital investments for providing such standby backup capabilities can be much lower than providing dual primary network nodes (not shown) for each enclosure 104. Several embodiments of the computer network 100 can also operate more efficiently and reliably than using dual primary network nodes per enclosure. Optical switches such as the primary optical switches 110 and standby optical switch 111 can be more reliably operated than switching between a pair of active dual primary network nodes. Operations and components of the network controller 120 are described in more detail below with reference to FIGS. 2A-2C.

Figure 2A:
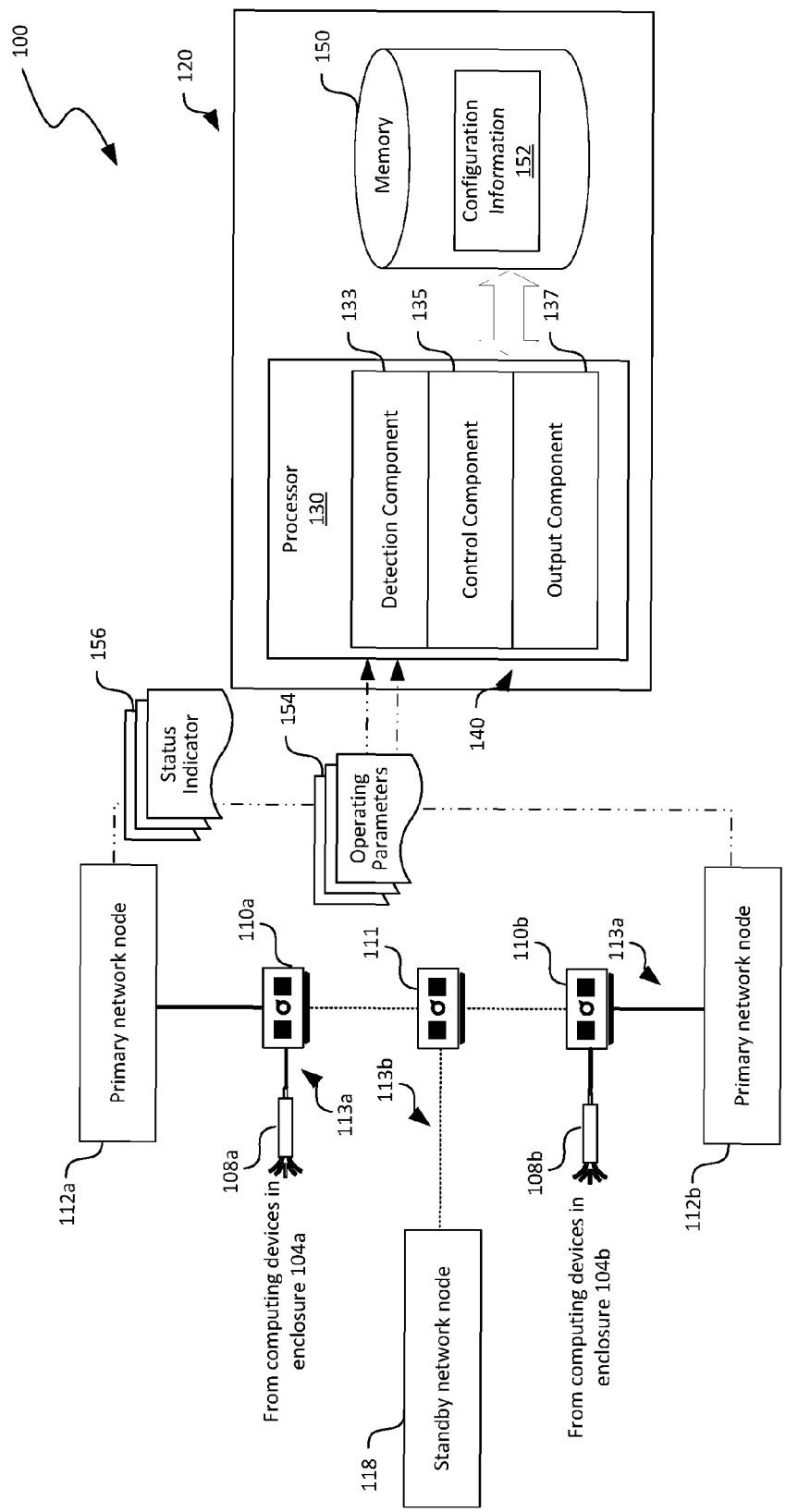
FIGS. 2A-2C are block diagram showing software components suitable for the network controller of FIG. 1 during various modes of operation in accordance with embodiments of the disclosed technology.
Figure 2B:
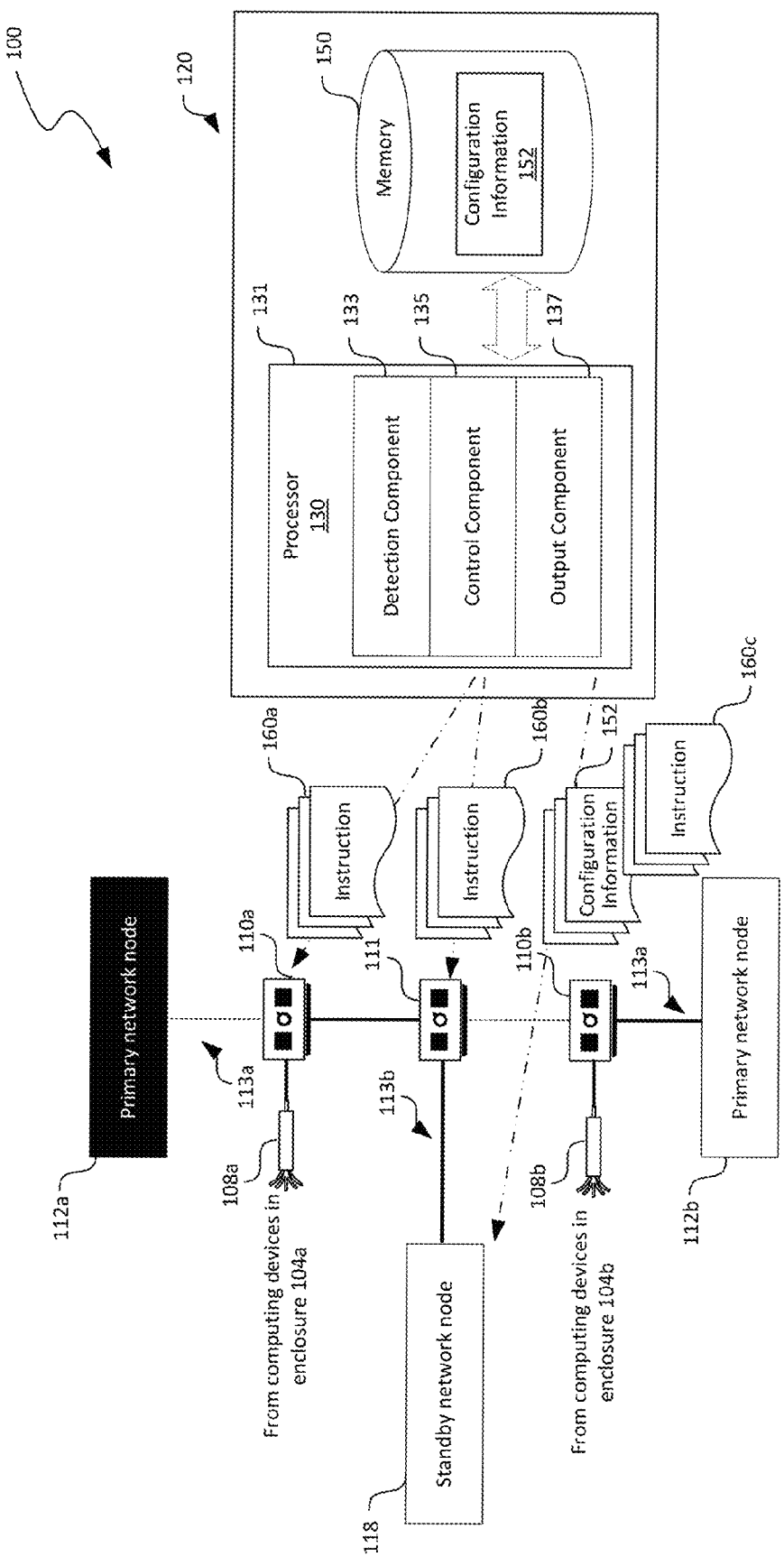
Figure 2C:
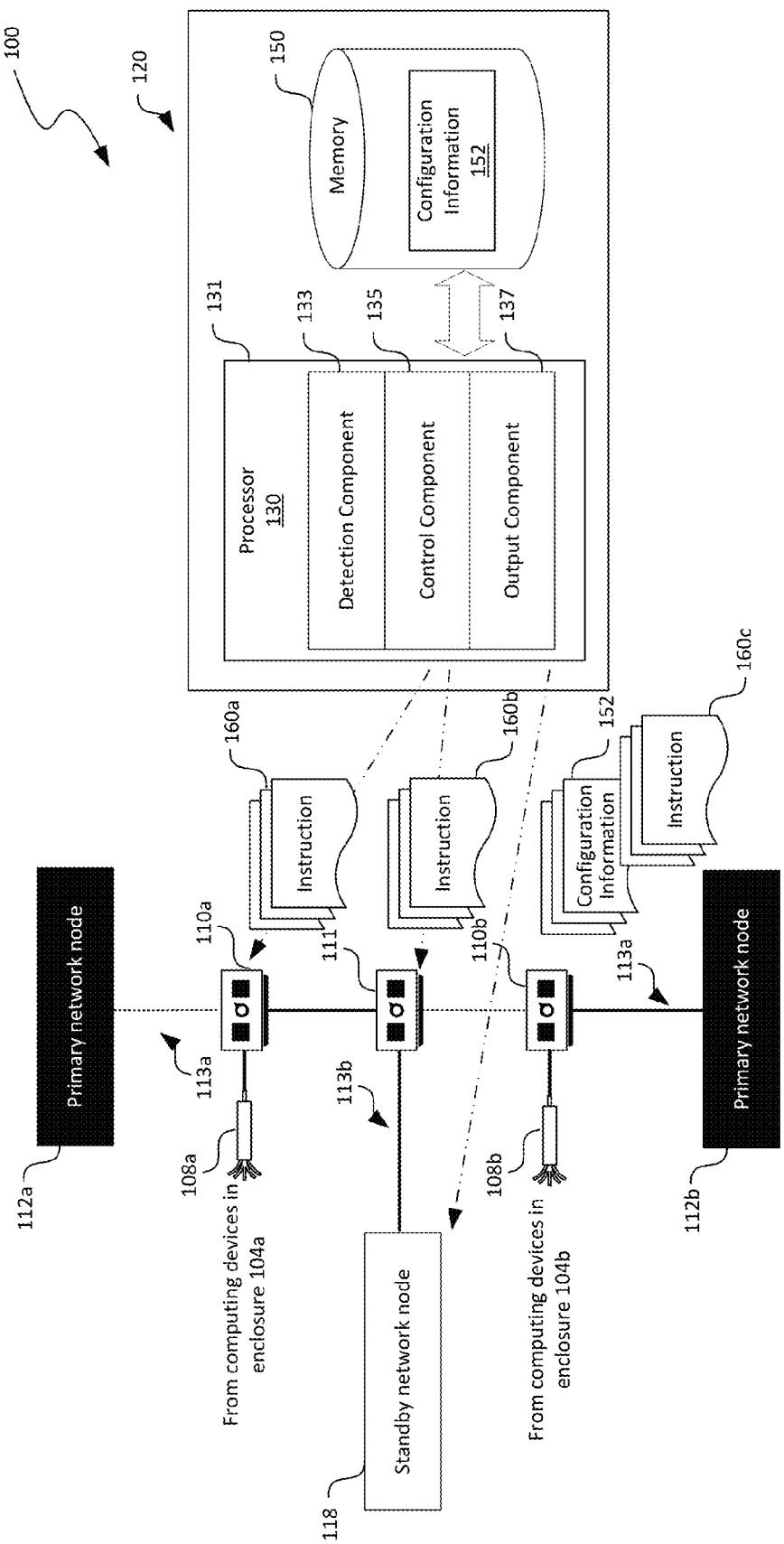

FIGS. 2A-2C are block diagram showing software components suitable for the controller of FIG. 1 during various modes of operation in accordance with embodiments of the disclosed technology. In particular, FIG. 2A illustrates a normal operating mode in which both the first and second primary network nodes 112a and 112b are functioning properly. FIG. 2B illustrates an operating mode in which an abnormal operating condition is detected at the first primary network node 112a but not the second primary network node 112b. FIG. 2C illustrates another operating mode in which an abnormal operating condition is detected at both the first primary network node 112a and the second primary network node 112b. In FIGS. 2A-2C, active connections are illustrated as solid lines while non-active connections are illustrated as dashed lines.

In FIGS. 2A-2C and in other Figures hereinafter, individual software components, objects, classes, modules, and routines may be a computer program, procedure, or process written as source code in C, C++, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). Components within a system may take different forms within the system. As one example, a system comprising a first component, a second component and a third component can, without limitation, encompass a system that has the first component being a property in source code, the second component being a binary compiled library, and the third component being a thread created at runtime.

The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry. A person of ordinary skill in the art would recognize that hardware can be considered fossilized software, and software can be considered liquefied hardware. As just one example, software instructions in a component can be burned to a Programmable Logic Array circuit, or can be designed as a hardware circuit with appropriate integrated circuits. Equally, hardware can be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2A, the network controller 120 can include a processor 130 operatively coupled to a memory 150. The processor 130 can include a microprocessor, a field-programmable gate array, and/or other suitable logic devices. The memory 150 can include volatile and/or non-volatile media (e.g., ROM; RAM, magnetic disk storage media; optical storage media; flash memory devices, and/or other suitable storage media) and/or other types of computer-readable storage media configured to store data received from, as well as instructions for, the processor 130 (e.g., instructions for performing the methods discussed below with reference to FIGS. 4-7).

As shown in FIG. 2A, the memory 150 can also contain records of sets configuration information 152 associated with the primary network nodes 112. A set of the configuration information 152 can include data suitable to cause a network node 102 (FIG. 1) to perform desired functions. For example, the configuration information 152 can include data of port configurations, routing tables, network addresses, connectivity configuration, enable/disable configuration, and/or other suitable information. In certain embodiments, the set of configuration information 152 can be collected from the primary network nodes 112 and updated on a continuous, periodic, or other suitable basis. In other embodiments, the set of configuration information 152 can be collected from the primary network nodes 112 and cached for a pre-determined period of time. In further embodiments, the set of configuration information 152 can be collected from the primary network nodes 112 on an ad hoc or other suitable basis.

The processor 130 can execute instructions to provide a plurality of software components 140 configured to facilitate providing backup capabilities to the primary network nodes 112. As shown in FIG. 2A, the software components 140 include a detection component 133, a control component 135, and an output component 137 operatively coupled to one another. In one embodiment, all of the software components 140 can reside on a single computing device (e.g., a server). In other embodiments, the software components 140 can also reside on multiple distinct servers or computing devices. In further embodiments, the software components 140 may also include network interface components and/or other suitable modules or components (not shown).

The detection component 133 can be configured to detect an abnormal operating condition at the individual primary network nodes 112. In certain embodiments, the detection component 133 can be configured to receive one or more operating parameters 154 from the individual primary network nodes 112 and indicate an abnormal condition based on the received operating parameters 154. For example, the operating parameters 154 can include an average, accumulative, or other suitable types of throughput values at the primary network nodes 112. In other examples, the operating parameters 154 can include instantaneous or average transmission speed, instantaneous or average change in throughput, network load balancing parameters, and/or other suitable parameters. In certain embodiments, the detection component 133 can poll the primary network nodes 112 for the operating parameters on a continuous or periodic basis. In other embodiments, the primary network nodes 112 can be configured to automatically transmit the operating parameters 154 to the detection component 133.

The detection component 133 can then compare the received operating parameters 154 with a corresponding threshold value to indicate whether the primary network nodes 112 are associated with abnormal operating conditions. For example, in certain embodiments, the detection component 133 can indicate an abnormal operating condition at the primary network nodes 112a based on comparisons indicating the following:

An associated average throughput over a period of time is below a threshold;

An accumulated throughput over a period of time is below a threshold;

An instantaneous transmission speed is below a threshold for a pre-determined period of time; or A change in throughput is greater than a throughput reduction threshold;

In other embodiments, the detection component 133 can indicate an abnormal operating condition at the primary network nodes 112a based on other suitable conditions.

In other embodiments, the detection component 133 can be configured to detect abnormal operating conditions by receiving one or more status indicators 156 from the primary network nodes 112. For example, the status indicator 156 can indicate that one of the primary network node 112 is in a non-operating mode, e.g., device failure, software update, system maintenance, or other suitable modes. The detection component 133 can then indicate an abnormal operating condition at the primary network nodes 112a based on the status indicators 156.

In certain embodiments, the detection component 133 can indicate an abnormal condition at the individual primary network nodes 112 with an impact period associated with the indicated abnormal condition. For example, if the status indicator 156 indicates that a primary network node 112 is undergoing software update, the detection component 133 can indicate the abnormal operating condition with an associated impact period (e.g., 10 minutes). At the expiration of the impact period, the detection component 133 may re-check a status of the corresponding primary network node 112. In other embodiments, the detection component 133 can indicate an abnormal condition (e.g., system failure) at the primary network nodes 112 without an impact period. Thus, the indication of the abnormal operating condition can be indefinite. In further embodiments, the detection component 133 can re-check a status of the primary network nodes 112 even without an associated impact period, for instance, over a pre-determined time periods. The detection component 133 can also be configured to forward an indicated abnormal operating condition at the individual primary network nodes 112 to the control component 135 for further processing.

The control component 135 can be configured to provide standby backup capabilities to a primary network node 112 associated with an indicated abnormal operating condition from the detection component 133. FIG. 2B illustrates an example in which the detection component 133 indicates an abnormal operating condition at the first primary network node 112a. As shown in FIG. 2B, in response to the indicated abnormal operating condition, the control component 135 can be configured to prompt the first primary optical switch 110a to switch connection from the first primary network node 112a to the standby network node 118. For example, the control component 135 can cause the output component 137 to transmit:

A first instruction 160a to the first primary optical switch 110a to switch connection from the first primary network node 112a to the standby optical switch 111; and
  A second instruction 160b to the standby optical switch 111 to connect the first primary optical switch 110a to the standby network node 118.

As such, the first optical switch 110a can switch from the first optical connection 113a to the second optical connection 113b (as shown in the solid lines).

The control component 135 can also retrieve a set of configuration information 152 associated with the first primary network node 112a from the memory 150. The control component 135 can then be configured to cause the output component 137 to transmit the retrieved configuration information 152 to the standby network node 118 along with an instruction (not shown) to configure the standby network node 118 based on the transmitted configuration information 152. In certain embodiments, the standby network node 118 can provide a confirmation message (not shown) to the control component 135 confirming successful completion of configuration based on the transmitted configuration information 152. Upon receiving the confirmation message, the control component 135 can cause the output component 137 to transmit another instruction 160c to the standby network node 118 to facilitate communications with the computing devices 106 (FIG. 1) based on the replicated configuration information 152. In other embodiments, the standby network node 118 can be configured to initiate facilitation of communications with the computing devices 106 once configuration is complete without the instruction 160c. As such, the computing devices 106 in the first enclosure 104a (FIG. 1) can communicate with other computing devices 106 via the first optical multiplexer 108a, the first optical switch 110a, the standby optical switch 111, and the standby network node 118.

The output component 137 is configured to transmit instructions, configuration information 152, and/or other suitable types of data to the various components of the computer network 100 (FIG. 1). In certain embodiments, the output component 137 can include a network interface controller. In other embodiments, the output component 137 can also include virtual network interface controller, a wireless network interface controller, or other suitable hardware/software components.

The control component 135 can also be configured to determine to provide standby backup capabilities to one or more selected primary network nodes 112 having abnormal operating conditions. FIG. 2C illustrates an example in which both the first and second primary network nodes 112 have an indicated abnormal operating conditions. In response to the indicated abnormal operating conditions at both the first and second primary network nodes 112, the control component 135 can be configured to determine a number of available standby network node(s) 118.

If the determined number of available standby network node(s) 118 is less than the number of primary network nodes 112 with abnormal operating conditions, in certain embodiments, the control component 135 can be configured to select one or more of the primary network nodes 112 based on, for example, an operating profile of the computing devices 106 associated with the primary network nodes 112, administrator preference, or other suitable criteria. The operating profile can include priority of tasks for execution, current operating modes of the computing devices 106, service availability guarantee associated with the computing devices 106, and/or other suitable characteristics. For instance, with respect to FIG. 2C, if the computing devices 106 associated with the first primary network node 112a are currently performing higher priority tasks (e.g., web searching), and are associated with a higher service availability guarantee than those associated with the second primary network node 112b, the control component 135 can be configured to select the first primary network node 112a over the second primary network node 112b. Once the first primary network node 112a is repaired, replaced, or otherwise becomes functional again, the control component 135 can then select the second primary node 112b. In another example, an administrator can modify a selection preference between the first or second primary network node 112a or 112b during an outage of these components. In yet further examples, the control component 135 can select one of the first or second primary network node 112a and 112b based on an administrator designation, random selection, or other suitable basis.

Based on the selection, the control component 135 can be configured to provide standby backup capabilities to the selected primary network node(s) 112 as discussed in more detail above with reference to FIG. 2B. In the illustrated embodiment, the first primary network node 112a is selected over the second primary network node 112b. As a result, control component 135 can cause the first primary optical switch 110a is switch connection from the first primary network node 112a to the standby network node 118.

Figure 3:
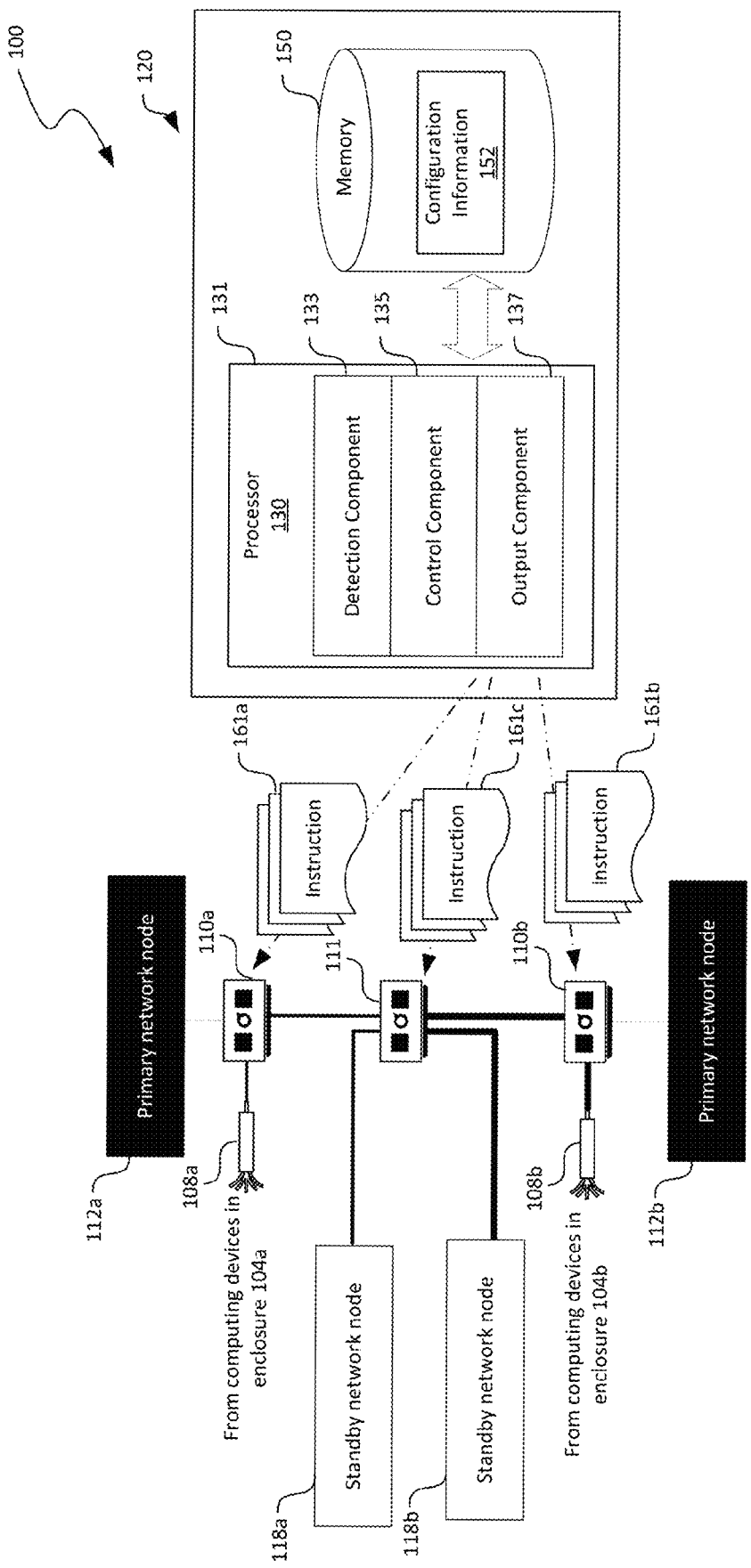
FIG. 3 is a block diagram showing software components suitable for the controller of FIG. 1 having multiple standby network node in accordance with embodiments of the disclosed technology.

If the determined number of available standby network node(s) 118 is not less than the number of primary network nodes 112 with abnormal operating conditions, the control component 135 can be configured to provide standby backup capabilities to all of the primary network nodes 112, as illustrated in FIG. 3. As shown in FIG. 3, the computer network 100 can include two standby network nodes 118 (individually identified as first and second standby network nodes 118a and 118b). The first and second standby network nodes 118a and 118b are both connected to the standby optical switch 111. The standby optical switch 111 can controllably connect the individual first and second standby network nodes 118a and 118b to the first and second optical switches 110a and 110b, respectively.

Upon receiving indication of abnormal operating conditions at both the first and second primary network nodes 112a and 112b, the control component 135 can be configured to cause the output component 137 to transmit:

A first instruction 161a to the first optical switch 110a to switch connection from the first primary network node 112a to the standby optical switch 111;
  A second instruction 161b to the second optical switch 110b to switch connection from the second primary network node 112b to the standby optical switch 111; and
  A third instruction 161c to the standby optical switch 111 to connect the first primary optical switch 110a to the first standby network node 118a and to connect the second primary optical switch 110b to the second standby network node 118b.

The control component 135 can also cause the configuration information 152 of the first and second primary network nodes 112a and 112b to be replicated at the first and second standby network nodes 118a and 118b, respectively. Thus, the first and second standby network nodes 118a and 118b can facilitate communications with the computing devices 106 in the first and second enclosures 104a and 104b in place of the first and second primary network nodes 112a and 112b, respectively.

Even though only two standby network nodes 118a and 118b are illustrated in FIG. 3, in other embodiments, the computer network 100 can also include three, four, or any suitable number of standby network nodes 118 (not shown). In certain embodiments, the number of standby network nodes 118 may be determined based on a threshold availability value (e.g., 99.9%) of the computing devices 106. In other embodiments, the number of standby network nodes 118 may be determined based on thresholds of capital investment, operating complexity, or other parameters.

FIG. 4 is a flow diagram illustrating embodiments of a process 200 of providing standby backup capabilities to a network node in a computer network in accordance with embodiments of the disclosed technology. The process 200 is described below with reference to the computer network 100 and software components of FIGS. 1-2C. For example, the network node can be the first or second primary network node 112 connected to the computing devices 106 (FIG. 1) via the first or second primary optical switches 110, respectively. In other embodiments, the process 200 can also be implemented in other suitable computer networks and/or hardware/software components.

As shown in FIG. 4, the process 200 includes detecting an abnormal operating condition at the network node at stage 202, for example, by utilizing the detection component 133 of FIG. 2A. In certain embodiments, detecting the abnormal operating condition can include continuously or periodically receive operating parameters from the network node and comparing the received operating parameters with corresponding thresholds, as described in more detail below with reference to FIG. 5. In other embodiments, detecting the abnormal operating condition can include receiving and analyzing status indicators from the network node. In further embodiments, detecting the abnormal operating condition can include a combination of comparing the received operating parameters with corresponding thresholds and analyzing status indicators from the network node. In yet further embodiments, detecting the abnormal operating condition can include receiving administrator input or utilizing other suitable techniques.

The process 200 can then include a decision stage 204 to determine whether an abnormal operating condition is detected at the network node. In response to determining that an abnormal operating condition is not detected at the network node, the process 200 includes reverting to detecting an abnormal operating condition at stage 202. In response to determining that an abnormal operating condition is detected at the network node, the process 200 includes switching optical connections from the network node to a standby network node at stage 206, for example, by utilizing the control component 135 of FIG. 2A. In certain embodiments, switching optical connections includes switching one or more optical switches, as described in more detail below with reference to FIG. 6. In other embodiments, switching optical connections can also include enabling/disabling optical switches and/or other suitable operations.

As shown in FIG. 4, the process 200 can further include enabling the standby network node to operate in place of the network node having the indicated abnormal operation condition at stage 208. In certain embodiments, enabling the standby network node includes configuring the standby network node with the same configuration information as the network node, as described in more detail below with reference to FIG. 7. In other embodiments, enabling the standby network node can also include verifying configuration of the standby network node and activating the configured standby network node via remote instructions or other suitable techniques.

Optionally, the process 200 can include re-checking condition of the network node by reverting to detecting abnormal operating condition at stage 202. In one embodiment, re-checking condition of the network node can be based on an impact period with the indicated abnormal operating condition, as described in more detail above with reference to FIG. 2A. In other embodiments, re-checking condition of the network node can be at a pre-selected time interval (e.g., one hour), upon administrator input, or based on other suitable criteria. In response to a determination that the indicated abnormal operating condition is cleared and/or the network node is in normal operating status, the process 200 can optionally include reverting optical connections to original configuration at stage 207. The process 200 can then optionally include returning the standby network node at a standby state at stage 209 by, for example, erasing configuration information from, re-initiating, and/or disabling the standby network node.

FIG. 5 is a flow diagram illustrating embodiments of a process 202 of detecting abnormal operating conditions at a network node to a computer network in accordance with embodiments of the disclosed technology. As shown in FIG. 5, the process 202 can include receiving operating parameters from the network node at stage 212. The operating parameters can include, for example, various types of throughput, speed, change of throughput, and/or other suitable parameters, as discussed above with reference to FIG. 2A. The process 202 can then include comparing the received operating parameters with threshold values at stage 214. The threshold values can be input by an administrator, based on historical values, and/or based on other suitable values. The process 202 can then include a decision stage 216 to determine whether the received operating parameters conform with the threshold values. For example, the process 202 can include determining whether a received throughput of the network node is below a threshold value. In response to determining that received operating parameters conform with the threshold values, the process 202 includes indicating a normal operating condition at stage 218; otherwise, the process 202 includes indicating an abnormal operating condition at stage 220.

Figures 6, 7:
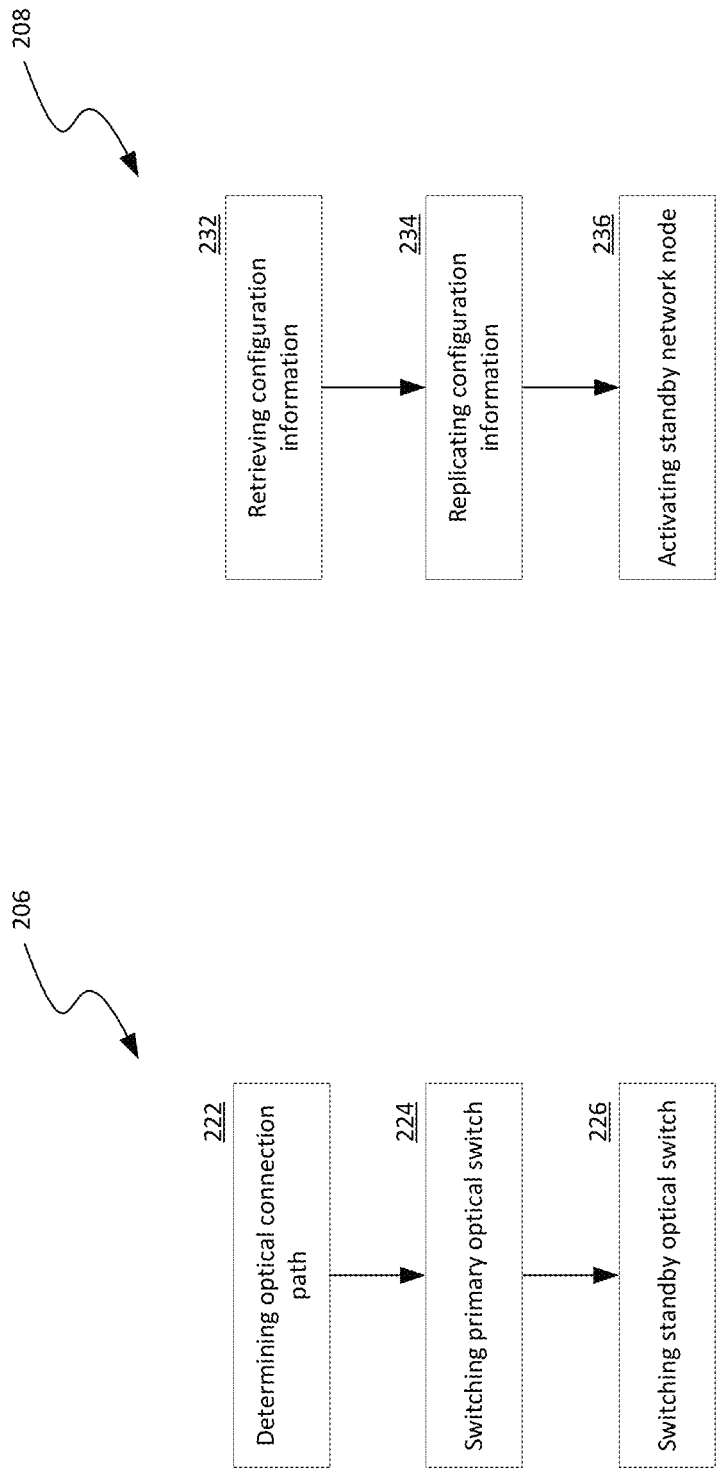
FIG. 6 is a flow diagram illustrating embodiments of a process of switching optical connections in a computer network in accordance with embodiments of the disclosed technology.
FIG. 7 is a flow diagram illustrating embodiments of a process of enabling a standby network node in a computer network in accordance with embodiments of the disclosed technology.

FIG. 6 is a flow diagram illustrating embodiments of a process 206 of switching optical connections in a computer network in accordance with embodiments of the disclosed technology. As shown in FIG. 6, the process 206 can include determining an optical connection path at stage 222, for example, by utilizing the control component 135 of FIG. 2A. In one embodiment, determining the optical connection path includes determining an optical connection path from the computing devices 106 (FIG. 1) associated with the network node to the standby network node. Based on the optical connection path, a switching pattern of one or more optical switches (e.g., the primary and/or standby optical switches 110 and 111 in FIG. 1) can be determined.

The process 206 can then include switching one or more primary optical switches 110 at stage 224 by, for example, utilizing the output component 137 of FIG. 2A to transmit a switching instruction to the first optical switch 110a to switch from the first primary network node 112a to the standby optical switch 111 shown in FIG. 2B. The process 206 can also include switching the standby optical switch 111 by transmitting another switching instruction at stage 226, for example, to connect the first optical switch 110a to the standby network node 118 shown in FIG. 2B. Even though the operations at stages 224 and 226 are shown as in series, in other embodiments, these operations may be performed generally concurrently.

FIG. 7 is a flow diagram illustrating embodiments of a process 208 of enabling a standby network node in a computer network in accordance with embodiments of the disclosed technology. As shown in FIG. 7, the process 208 can include retrieving a set of configuration information associated with the network node. In one embodiment, the set of configuration information can be retrieved from the memory 150 in FIG. 2A. In other embodiments, the set of configuration information can be retrieved from the network node directly.

The process 208 can then include replicating the retrieved configuration information at the standby network node at stage 234. In one embodiment, replicating the configuration information includes transmitting the retrieved configuration information to the standby network node with an instruction to configure based on the configuration information. In other embodiments, configuration information may be replicated manually or via other suitable techniques. The process 208 can then include activating the standby network node with the replicated configuration information at stage 236. In one embodiment, activating the standby network node can be automatic. In other embodiments, activating the standby network node can include transmitting an activation instruction to the standby network node.

Figure 8:
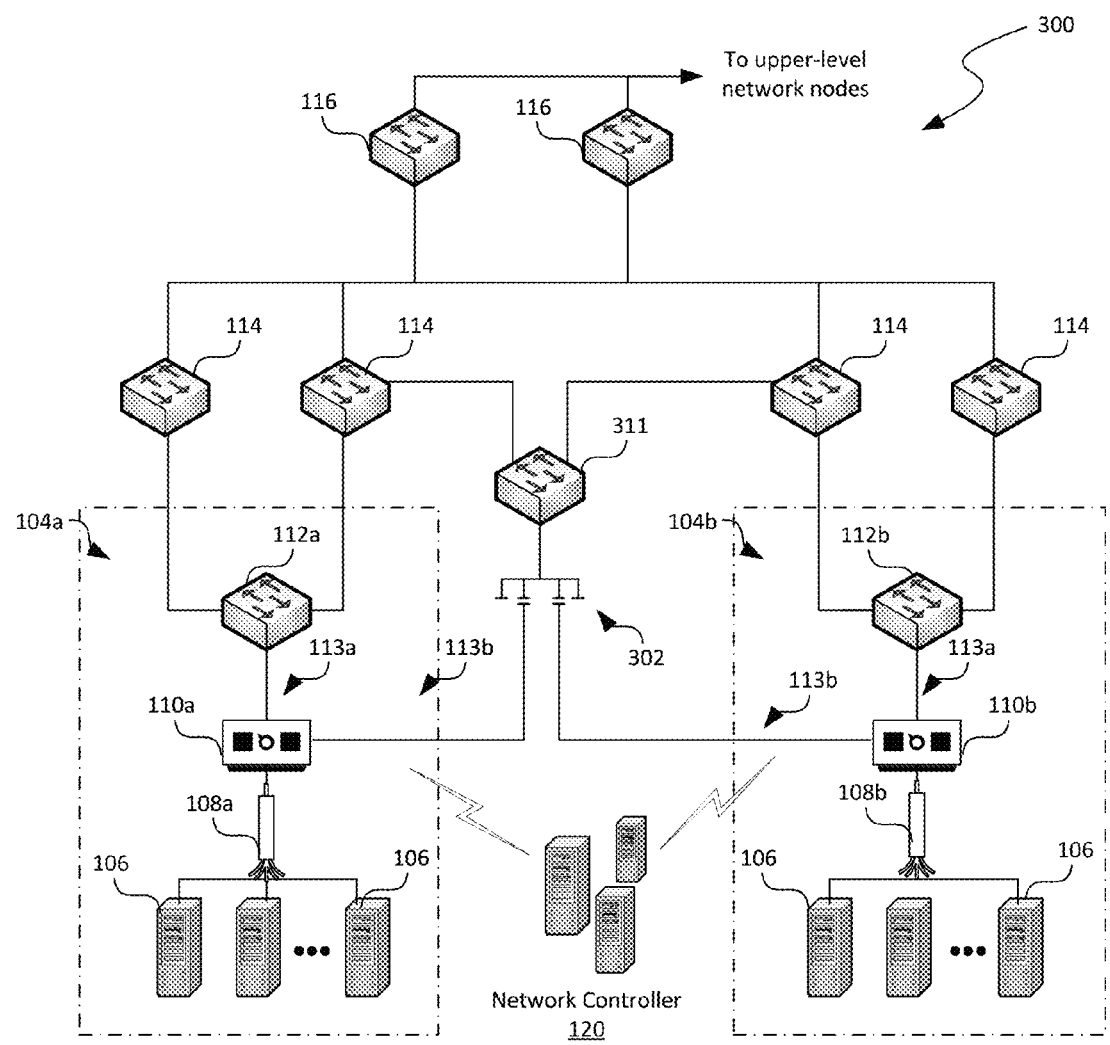
FIG. 8 is a schematic diagram illustrating another computer network having a standby network node with multiple input ports in accordance with embodiments of the disclosed technology.

FIG. 8 is a schematic diagram illustrating another computer network 300 having a standby network node with multiple input ports in accordance with embodiments of the disclosed technology. The computer network 300 can include components generally similar to those of the computer network 100 shown in FIG. 1. As such, similar references denote similar components. Unlike the computer network 100 in FIG. 1, the computer network 300 in FIG. 8 does not include the standby optical switch 111. Instead, the computer network 300 includes a standby network node 311 having multiple optical input ports 302. In the illustrated embodiment, four optical input ports 302 are shown for illustration purposes. In other embodiments, the standby network node 311 can include two, three, or any other suitable number of optical input ports.

As shown in FIG. 8, an output port from each of the primary optical switches 110 is connected to a corresponding optical input port 302 of the standby network node 311. As such, during operation, network controller 120 can cause the primary optical switches to switch from the first optical connection 113a to the second optical connection 113b without switching the standby optical switch 111 of FIG. 1. The network controller 120 can then cause the standby network node 311 to provide standby backup capabilities to the primary network nodes 112 as discussed above with reference to FIGS. 1-2C.

Figure 9:
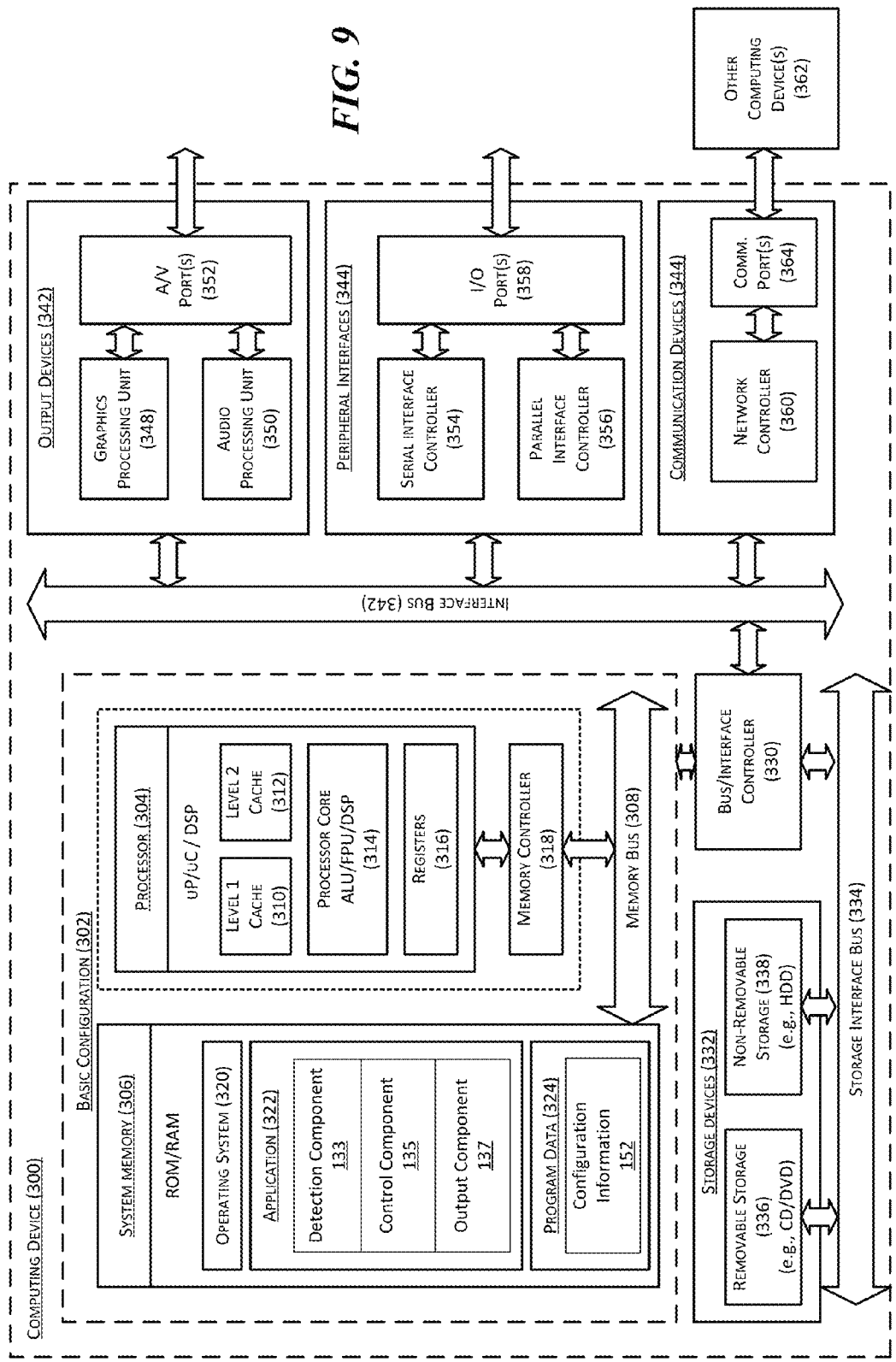
FIG. 9 is a computing device suitable for certain components of the computing frameworks in FIGS. 1-3 and 8.

FIG. 9 is a computing device 400 suitable for certain components of the computing network 100 in FIGS. 1-2B.

For example, the computing device 400 may be suitable for the computing device 106 or the network controller 120 of FIG. 1. In a very basic configuration 402, computing device 400 typically includes one or more processors 404 and a system memory 406. A memory bus 408 may be used for communicating between processor 404 and system memory 406.

Depending on the desired configuration, the processor 404 may be of any type including but not limited to a microprocessor (μP), a microcontroller (μC), a digital signal processor (DSP), or any combination thereof. The processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, the system memory 406 may be of any type including but not limited to volatile memory (such as RAM), non-volatile memory (such as ROM, flash memory, etc.) or any combination thereof. The system memory 406 can include an operating system 420, one or more applications 422, and program data 424. As shown in FIG. 9, in certain embodiments, the application 422 may include, for example, the detection component 133, the control component 135, and the output component 137, as described in more detail above with reference to FIG. 2A. In other embodiments, the application 422 can also include other suitable components. The program data 424 may include, for example, the configuration information 152. This described basic configuration 402 is illustrated in FIG. 9 by those components within the inner dashed line.

The computing device 400 may have additional features or functionality, and additional interfaces to facilitate communications between basic configuration 402 and any other devices and interfaces. For example, a bus/interface controller 430 may be used to facilitate communications between the basic configuration 402 and one or more data storage devices 432 via a storage interface bus 434. The data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 406, removable storage devices 436, and non-removable storage devices 438 are examples of computer readable storage media. Computer readable storage media include storage hardware or device(s), examples of which include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which may be used to store the desired information and which may be accessed by computing device 400. Any such computer readable storage media may be a part of computing device 400. The term "computer readable storage medium" excludes propagated signals and communication media.

The computing device 400 may also include an interface bus 440 for facilitating communication from various interface devices (e.g., output devices 442, peripheral interfaces 444, and communication devices 446) to the basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 400 may also be implemented as a personal computer including both laptop computer and non-laptop computer configurations.

Specific embodiments of the technology have been described above for purposes of illustration. However, various modifications may be made without deviating from the foregoing disclosure. In addition, many of the elements of one embodiment may be combined with other embodiments in addition to or in lieu of the elements of the other embodiments. Accordingly, the technology is not limited except as by the appended claims.

We claim:

1. A method for providing communications backup in a computer network that includes:
   multiple primary network nodes and a standby network node;
   multiple primary optical switches individually having:
      an input port coupled to one or more computing devices;
      a first output port coupled to one of the primary network nodes; and
      a second output port different from the first output port;
   a standby optical switch having multiple input ports individually coupled to the second output port of the primary optical switches and an output port coupled to the standby network node;
   wherein the method comprising:
      receiving, from the primary network nodes via the computer network, data representing operating parameters or a status indicator of the primary network nodes;
      determining, based on the received data, an abnormal operating condition exists at one of the primary network nodes; and
      in response to determining that the abnormal operation condition exists at the primary network node, switching one of the primary optical switches corresponding to the primary network node and the standby optical switch from a first optical connection to a second optical connection, wherein:
         the first optical connection is between the one or more computing devices and the primary network node via the input port and the first output port of the corresponding primary optical switch; and
         the second optical connection is between the one or more computing devices and the standby network node via the input port and the second output port of the corresponding primary optical switch, and one of the input ports and the output port of the standby optical switch.

2. The method of claim 1 wherein switching one of the primary optical switches corresponding to the primary network node and the standby optical switch includes:
   switching the primary optical switch from outputting via the first output port to outputting via the second output port; and
   switching the standby optical switch to connect the output port to one of the input ports coupled to the second output port of the primary optical switch.

3. The method of claim 1 wherein:
   the standby network node is a first standby network node;
   the output port of the standby optical switch is a first output port of the standby optical switch coupled to the first standby network node;
   the standby optical switch further includes a second output port coupled to a second standby network node of the computer network;
   the method further includes, in response to determining that the abnormal operation condition exists at the primary network node, selecting the first standby network node as a backup network node; and
   the second optical connection is between the one or more computing devices and the selected first network node via the input port and the second output port of the corresponding primary optical switch, one of first input ports and the output port of the standby optical switch.

4. The method of claim 1 wherein:
   The multiple primary network nodes include first and second primary network nodes; and
   determining an abnormal operating condition exists at one of the primary network nodes includes determining that an abnormal operating condition exists at both the first primary network node and the second primary network node;
   the method further includes selecting one of the first primary network node or the second primary network node based on operating profiles of the one or more computing device coupled to the first and second primary network nodes, respectively; and switching one of the primary optical switches corresponding to the primary network node and the standby optical switch includes switching one of the primary optical switches corresponding to the first or second primary network node to switch from being connected to the first primary network node or the second primary network node, respectively, to being connected to the standby optical switch.

5. The method of claim 1, further comprising in response to determining that the abnormal operation condition exists at the primary network node, configuring the standby network node using configuration information collected from the one of the primary network nodes such that the standby network node functions generally similarly as the one of the primary network nodes.

6. The method of claim 1, further comprising in response to determining that the abnormal operation condition exists at the primary network node, configuring the standby network node using configuration information collected from the one of the primary network nodes such that the standby network node functions generally similarly as the one of the primary network nodes, wherein the configuration information includes data representing parameters of port configuration and a routing table.

7. The method of claim 1, further comprising:
in response to determining that the abnormal operation condition exists at the primary network node, configuring the standby network node using configuration information collected from the one of the primary network nodes such that the standby network node functions generally similarly as the one of the primary network nodes, wherein the configuration information includes data representing parameters of port configuration and a routing table;
receiving a notification from the standby network node indicating configuration is completed successfully;
in response to receiving the notification, switching one of the primary optical switches corresponding to the primary network node and the standby optical switch from the first optical connection to the second optical connection.

8. A method performed by a computing device in a computer network that includes:
first and second primary network nodes and a standby network node;
a first primary optical switch having an input port coupled to one or more first servers, a first output port coupled to the first primary network node, and a second output port;
a second primary optical switch having an input port coupled to one or more second servers, a first output port coupled to the second primary network node and a second output port; and
a standby optical switch having first and second input ports individually coupled to the second output port of the first and second primary optical switches, and an output port coupled to the standby network node, wherein the method comprising:
receiving data representing operating parameters or a status indicator from the first and second primary network nodes;
determining, based on the received data, whether at least one of the first or second primary network node has an abnormal operating condition; and
in response to determining that the first primary network node has an abnormal operation condition,
switching the first primary optical switch from outputting via the first output port to outputting via the second output port that is coupled to the first input port of the standby optical switch; and
switching the standby optical switch to connect the first servers coupled to the input port of the first primary optical switch to the standby network node via the input port of the primary optical switch, the second output port of the primary optical switch, and the first input port of the standby optical switch.

9. The method of claim 8 wherein:
the standby network node is a first standby network node;
the output port of the standby optical switch is a first output port of the standby optical switch;
the standby optical switch further includes a second output port coupled to a second standby network node; and
the method further includes, in response to the detected abnormal operation condition of the first primary network node, selecting one of the first standby network node or the second standby network node as a backup network node; and
switching the standby optical switch includes switching the standby optical switch to connect the first servers to the selected one of the first standby network node or second standby network node via one of the first or second output port of the standby optical switch.

10. The method of claim 8 wherein:
the standby network node is a first standby network node;
the output port of the standby optical switch is a first output port of the standby optical switch;
the standby optical switch further includes a second output port coupled to a second standby network node; and
the method further includes, in response to the detected abnormal operation condition of the first primary network node,
selecting one of the first standby network node or the second standby network node as a backup network node; and
replicating configuration information from the first primary network node to the backup network node; and
switching the standby optical switch includes switching the standby optical switch to connect the first servers to the selected one of the first standby network node or second standby network node via one of the first or second output port of the standby optical switch.

11. The method of claim 8 wherein:
determining whether at least one of the first or second primary network nodes has the abnormal operating condition includes determining that both the first and second primary network nodes have an abnormal operating condition;
the method further includes selecting the first primary network node over the second primary network node based on operating profiles of the first servers and the second servers; and
switching the standby optical switch includes switching the standby optical switch to connect the first servers coupled to be connected to the standby network node via the input port of the primary optical switch, the second output port of the primary optical switch, and the first input port of the standby optical switch.

12. The method of claim 8, further comprising:
in response to determining that the first primary network node has an abnormal operation condition, replicating configuration information from the first primary network node to the standby network node; and switching the standby optical switch includes switching the standby optical switch to connect the first servers coupled to the input port of the first primary optical switch to the standby network node upon completing of replicating the configuration information.

13. The method of claim 8, further comprising:

in response to determining that the first primary network node has an abnormal operation condition, replicating configuration information from the first primary network node to the standby network node, wherein the configuration information includes data representing parameters of port configuration and a routing table; and switching the standby optical switch includes switching the standby optical switch to connect the first servers coupled to the input port of the first primary optical switch to the standby network node upon completing of replicating the configuration information.

14. A computing device for managing communications backup in a computer network that includes:

multiple primary network nodes and a standby network node;

multiple primary optical switches individually having:
an input port coupled to one or more computing devices;
a first output port coupled to one of the primary network nodes; and
a second output port different from the first output port;

a standby optical switch having multiple input ports individually coupled to the second output port of the primary optical switches and an output port coupled to the standby network node;

wherein the computing device includes a processor and a memory containing instructions executable by the processor to cause the processor to:

receive, from the primary network nodes via the computer network, data representing operating parameters or a status indicator of the primary network nodes;

determine, based on the received data, an abnormal operating condition exists at one of the primary network nodes; and in response to determining that the abnormal operation condition exists at the primary network node, switch one of the primary optical switches corresponding to the primary network node and the standby optical switch from a first optical connection to a second optical connection, wherein:

the first optical connection is between the one or more computing devices and the primary network node via the input port and the first output port of the corresponding primary optical switch; and the second optical connection is between the one or more computing devices and the standby network node via the input port and the second output port of the corresponding primary optical switch, and one of the input ports and the output port of the standby optical switch.

15. The computing device of claim 14 wherein to switch one of the primary optical switches corresponding to the primary network node and the standby optical switch includes:

switch the primary optical switch from outputting via the first output port to outputting via the second output port; and switch the standby optical switch to connect the output port to one of the input ports coupled to the second output port of the primary optical switch.

16. The computing device of claim 14 wherein:

the standby network node is a first standby network node;

the output port of the standby optical switch is a first output port of the standby optical switch coupled to the first standby network node;

the standby optical switch further includes a second output port coupled to a second standby network node of the computer network;

the memory contains additional instructions executable by the processor to cause the processor to, in response to determining that the abnormal operation condition exists at the primary network node, select the first standby network node over the second standby network node as a backup network node; and the second optical connection is between the one or more computing devices and the selected first network node via the input port and the second output port of the corresponding primary optical switch, one of first input ports and the output port of the standby optical switch.

17. The computing device of claim 14 wherein:

the multiple primary network nodes include first and second primary network nodes; and to determine an abnormal operating condition exists at one of the primary network nodes includes to determine that an abnormal operating condition exists at both the first primary network node and the second primary network node;

the memory contains additional instructions executable by the processor to cause the processor to select one of the first primary network node or the second primary network node based on operating profiles of the one or more computing device coupled to the first and second primary network nodes, respectively; and switch one of the primary optical switches corresponding to the first or second primary network node to switch from being connected to the first primary network node or the second primary network node, respectively, to being connected to the standby optical switch.

18. The computing device of claim 14 wherein the memory contains additional instructions executable by the processor to cause the processor to, in response to determining that the abnormal operation condition exists at the primary network node, configure the standby network node using configuration information collected from the one of the primary network nodes such that the standby network node functions generally similarly as the one of the primary network nodes.

19. The computing device of claim 14 wherein the memory contains additional instructions executable by the processor to cause the processor to, in response to determining that the abnormal operation condition exists at the primary network node, configure the standby network node using configuration information collected from the one of the primary network nodes such that the standby network node functions generally similarly as the one of the primary network nodes, wherein the configuration information includes data representing parameters of port configuration and a routing table.

20. The computing device of claim 14 wherein the memory contains additional instructions executable by the processor to cause the processor to:

in response to determining that the abnormal operation condition exists at the primary network node, configure the standby network node using configuration information collected from the one of the primary network nodes such that the standby network node functions generally similarly as the one of the primary network nodes, wherein the configuration information includes data representing parameters of port configuration and a routing table;

receive a notification from the standby network node indicating configuration is completed successfully; and in response to receiving the notification, switch one of the primary optical switches corresponding to the primary network node and the standby optical switch from the first optical connection to the second optical connection.

* * * * *